June 30, 1959  A. W. SMITH ET AL  2,892,567
FEEDER MECHANISM
Filed July 1, 1955  2 Sheets-Sheet 1
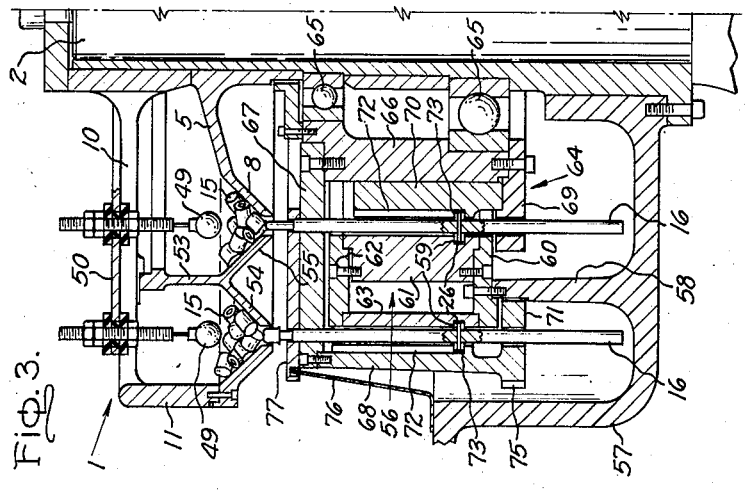
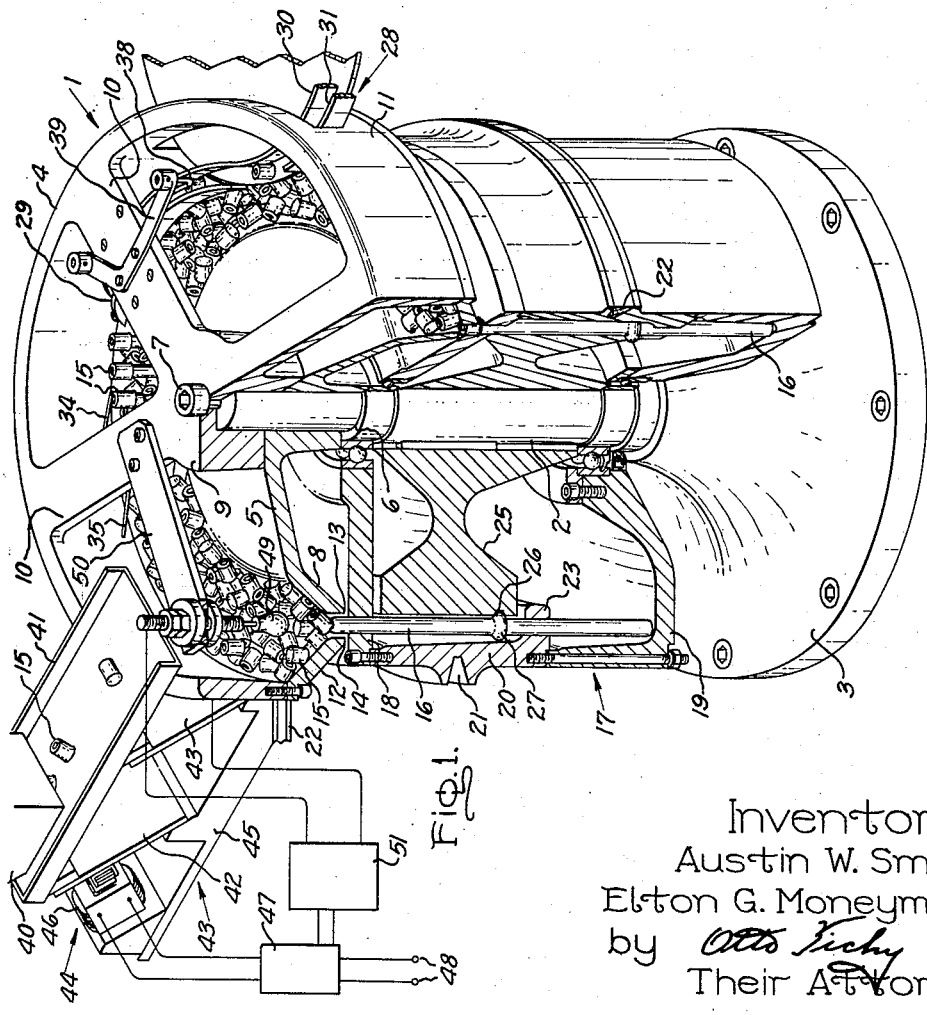
Inventors:
Austin W. Smith,
Elton G. Moneymaker,
by Otto Fuchs
Their Attorney.

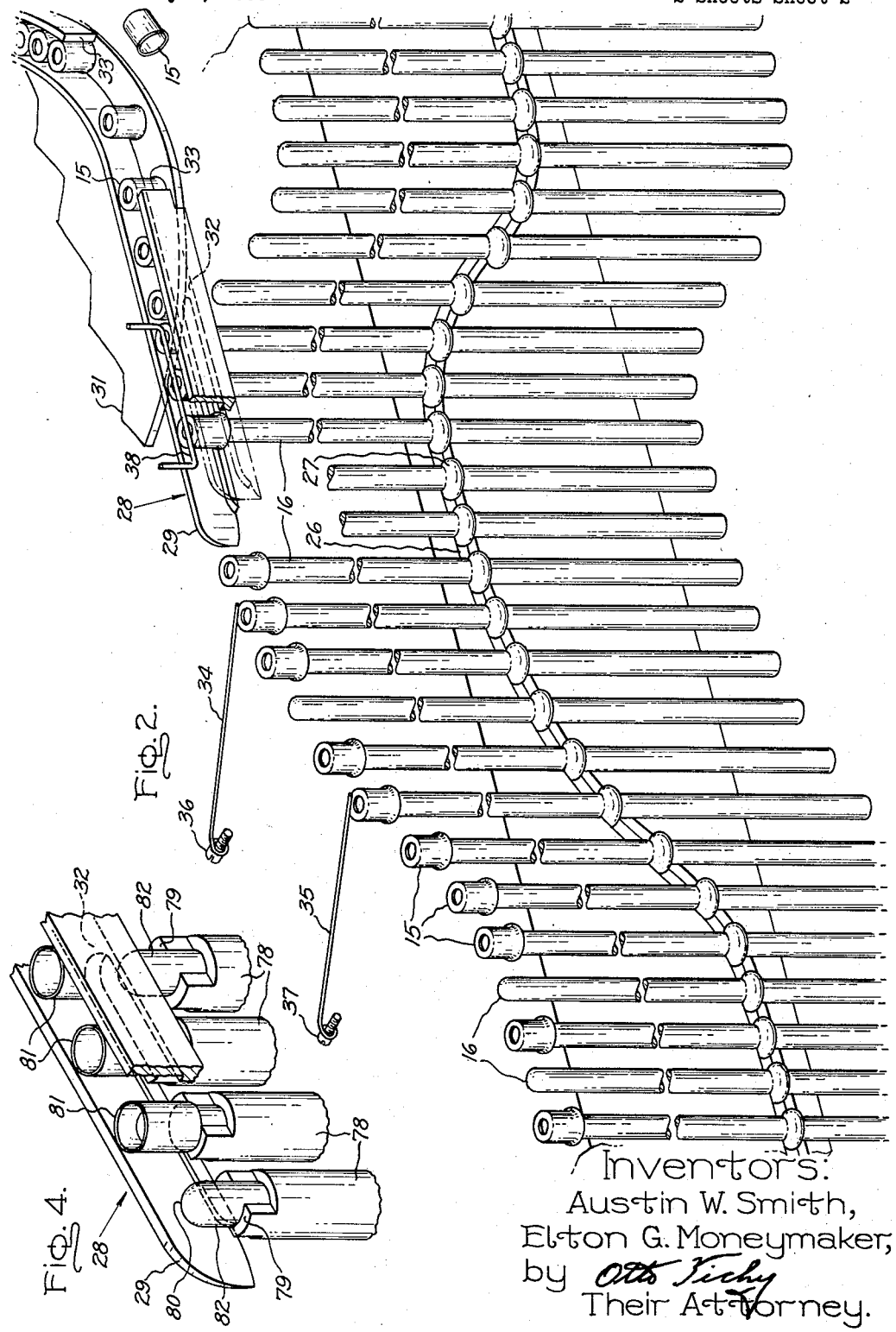

United States Patent Office 2,892,567
Patented June 30, 1959

2,892,567
FEEDER MECHANISM

Austin W. Smith, Chesterland, and Elton G. Moneymaker, Willoughby, Ohio, assignors to General Electric Company, a corporation of New York Application July 1, 1955, Serial No. 519,412

9 Claims. (Cl. 221—10)

The present invention relates to a feeder mechanism useful in the arts generally and particularly for feeding thin-walled metal shells, or the like, to machines for performing an operation on the fed shells.

In the manufacture of electric lamps, for example, such as incandescent lamps, photoflash lamps, and the like, the metal base shells for the lamps are fed to a variety of machines, each capable of performing a particular operation on each base shell. Base shell feeders are used in conjunction with machines, among others, for forming threads in the cylindrical side walls of the base shells and also machines for inserting the glass insulating part of the usual commercial bases.

Inasmuch as such machines operate at high speed for the economical mass production of such lamps, the feeders must be capable of supplying thereto base shells in large quantity with their thin walls undamaged in the operation of the feeder. Another requirement for such feeders is that base shells of the type having one end at least partially closed be presented to the machine being fed with their corresponding ends facing in one direction.

The principal object of the present invention is to provide a feeder mechanism capable of satisfying the above requirements. Another object of the invention is to provide a feeder mechanism which is relatively quiet in operation due to the absence of continuously vibrating components in its operating mechanism. Still further objects and advantages of the invention will appear from the following detailed description of species thereof taken in conjunction with the attached drawings and from the appended claims.

A feature of the invention is a stationary hopper having a horizontal, shell-receiving, straight-sided shallow trough having an open bottom with the walls of the bottom opening defining a channelway for a series of spaced apart shell pick-up rods.

Another feature of the invention is a rod-supporting and actuating means mounted beneath the hopper for continuously moving the shell pick-up rods along the channelway with their upper ends in a shell pick-up position with respect to said channelway for an appreciable distance along said channelway whereby to agitate the mass of shells in the trough and to cause shells from the agitated mass to slip onto the upper ends of the moving rods.

The supporting and actuating assembly also includes cam means for lifting the moving rods gradually and in sequence to bring their upper or shell pick-up ends to a shell delivery level above the mass of shells in the hopper and for thereafter lowering the moving rods to return their upper ends to their shell pick-up positions with respect to the channelway.

Another feature of the invention is a shell take-off assembly including a shell guiding channel having a bifurcated end mounted above the level of the mass of shells in the hopper and in the path of travel of the upper ends of the rods in the extreme lifted position of the said rod ends to receive the said rod ends and retain thereon the shells carried by the rods when the latter are lowered to their shell pick-up position.

Further advantageous features of the invention are shown in the accompanying drawings of species of base shell feeders embodying the invention.

In the drawings,

Fig. 1 is a perspective view, partly in section, taken from a position slightly above a feeder embodying the invention;

Fig. 2 is a lay-out view showing the shell pick-up rods of the feeder of Fig. 1 approaching, at, and leaving the shell delivery level and showing also a rod guiding groove in the face of a stationary cam of the feeder;

Fig. 3 is a fragmentary sectional view of another feeder embodying the invention; and Fig. 4 is a view similar to Fig. 2 and showing a modification of the shell pick-up rods useful with the embodiments of the invention shown in Fig. 3.

Like numbers denote like parts in all the figures.

Referring to Figs. 1 and 2 of the drawing, the stationary hopper having a shell receiving trough provided with a bottom opening defining a channelway is shown at 1 in Fig. 1. The shell pick-up rods movable along the channelway are shown at 16 in Figs. 1 and 2 and the shell guiding channel of the take-off assembly mounted above the level of the mass of shells in the hopper 1 is shown at 28 in Figs. 1 and 2.

Referring to Fig. 1 of the drawings, the hopper 1 is a stationary, circular-shaped, open-top hopper mounted in a horizontal position on a vertical center post 2 extending upward from a mounting platform 3. The hopper 1 is made in two circular parts 4 and 5, each resting on the center post 2 with the part 4 resting on top of the post and also against the part 5 which rests on the shoulder 6 of the post. A hold-down belt 7 on the post 2 is provided for these parts. The hopper part 5 is in the form of a stationary collar around the post 2 and slopes downwardly toward its periphery, first gently and then more abruptly at its rim portion 8. The hopper part 4 is wheel-like in shape with its hub or center 9 resting on the top of post 2, its flat, spaced spoke-like radial supports 10 providing openings at the top of the hopper and its flat rim constituting the cylindrical outer wall 11 of the hopper. The outer wall 11 of the hopper has bolted thereto an annular flange 12 which slopes inwardly in a downward direction and terminates opposite the rim 13 of the collar-shaped part 5 to form with the rim portion 8 of the part 5 a straight-sided, circular trough, V-shaped in cross section.

The inner periphery or rim 14 of the annular flange part 12 is spaced from the rim 13 of the part 5 to define therewith a circular channelway at the bottom of the trough extending completely around the circular hopper 1.

As shown in Figs. 1 and 2, the metal base shells 15 are of the type having one end partially closed by an inwardly extending flange. The shells 15 in the hopper 1 collect in the trough formed by the portions 8 and 12 of the hopper parts 4 and 5. The width of the channelway between the rim parts 13 and 14 of the portions 8 and 12 is slightly larger than the outer diameter of the shells so that shells could fall therethrough.

The falling of shells through the channelway is prevented, however, by the shell pick-up rods 16 supported beneath the hopper to block the channelway in a vertical direction. The distance between centers of the top ends of the rods in the channelway is such that the space between the rods is less than the outer diameter of the shells so that the latter are prevented by the rods from falling out of the hopper through the open channelway.

The upper ends of the rods 16 are smaller in diameter than the diameter of the larger end opening in the base shells 15 and larger in diameter than the smaller end opening of the said shells so that shells may slip onto and be supported by the upper ends of the rods as the rods move along the channelway. The channelway is wide enough to accommodate between its vertical sides provided by the rims 13 and 14 the shells which have slipped onto the upper ends of the rods.

The rods 16 are supported in properly spaced parallel relation along the channelway by a drum-shaped member 17 having its top 18 and its bottom 19 journaled on the support post 2. The cylindrical side wall 20 of the drum 17 is bolted to the top and bottom parts thereof and is provided with a circular groove 21 in its outer surface which is engaged by a V-shaped driving belt 22 connected to the main drive means (not shown) of the feeder. Each of the rods 16 extend through and make a slip fit with openings provided therefor in the top 18 of the drum 17 and in an inwardly extending flange 23 on the side wall 20. The said openings in the respective drum parts 18 and 23 are aligned so as to hold the rods 16 vertically and in spaced, parallel relation to each other in a circular formation in the channelway at the bottom of the trough in the hopper 1.

The vertical movements or strokes of the rods 16 with respect to the hopper 1 are controlled by a stationary cylindrical cam 25 mounted within the drum 17 and on the support post 2. The cam 25 is provided on its outer face with a groove 26 which constitutes the cam face and which is engaged by a circular flange 27 on each of the rods 16. The groove 26 extends horizontally through a circular arc of 190 degrees, then slopes gradually upward on the cam face for about 100 degrees of a circular arc, then horizontally for about 15 degrees and then downwardly for about 55 degrees of a circular arc.

The above described parts of the feeder are so constructed and arranged that, as the drum 17 is rotated around the support post 2 and the stationary cam 25, the top ends of the rods are in the channelway as shown in Fig. 1 for an angular distance of 190 degrees. Shells from the mass of shells in the trough slip over the top ends of the rods while the said rod ends travel along the channelway. In the succeeding 100 degrees of travel of the rods, the top ends thereof with the shells thereon gradually rise in the trough to a level above the mass of shells in the trough. Thereafter the top ends of the rods move in a horizontal circular path at this level for an angular distance of about 15 degrees.

A shell take-off channel 28 having a bifurcated receiving end as shown in Figs. 1 and 2 and described below is positioned at this level and in the circular path of movement of the top ends of the rods to receive therein the shell bearing rod ends. At the end of this horizontal path of movement the top ends of the rods start their return to the channelway leaving the shells in the take-off channel. The downward movement of the top ends of the rods continues while the drum rotates an angular distance of about 55 degrees.

On each succeeding revolution, the rods are rotated through a complete circle and oscillate vertically as described above to pick up shells from the trough and deliver the said shells to the take-off channel. As the drum is so rotated the rods are moved gradually between the bottom and the top of their stroke with a dwell between each movement so that the rods, except at the bottom of their stroke, plow through and agitate the mass of shells accommodated in the trough.

The shell take-off channel 28 referred to above is best shown in Fig. 2 and, as shown, is S-shaped with its shell receiving end portion 29 above the trough and having the same degree of curvature as the circular path followed by the upper ends of the lifted rods and its shell delivery end portion 30 extending out of the hopper through the wall 11 and having the same degree of curvature as the peripheral portion of the rotatable disc-shaped table 31 mounted at the delivery end of the channel 28.

The bottom plate 32 (Fig. 2) of the shell take-off channel 28 is bifurcated at the shell receiving end 29 of the channel. The bifurcated end of the plate 32 extends an appreciable distance along the path of movement of the top ends of the rods 16 in the fully lifted position of the rods. The bifurcated end portion of the bottom plate extends slightly beyond the point at which the lifted upper ends of the rods begin their descent to the channelway at the bottom of the trough.

The forks of this bifurcated portion of the bottom plate 32 are spaced apart a distance greater than the diameter of the upper ends of the rods and less than the outer diameter of the shells and are located slightly below the shells when the upper end of the rods are in their fully raised positions.

Thus, the top ends of the rods carry the shells thereon into the take-off channel and when the rods descend toward the channel way at the bottom of the trough, the shells carried thereby remain in the take-off channel.

As each shell is separated from the top end of its supporting rod it imparts a forward movement to the shell delivered by the preceding rod of the series and this continuing action results in a forward movement of the shells along the channel and onto the peripheral portion of the disc-shaped table 31 rotating beneath the open bottom part 30 of the channel 28. The table 31 is rotated at such speed relative to the rate of delivery of shells to the channel 28 that the shells are carried out of the channel 28 at the same rate to avoid clogging of the channel by the shells. A spillgap between edges 33 is provided at that side of the channel 28 at the rim of the table 31 and over the trough in the hopper to allow shells to drop back in the trough if shell movement along channel 28 is retarded for any reason.

Rotation of the table can be effected by conventional means (not shown) preferably connected to the drive means for the drum 17. The shells are delivered by the table 31 to the mouth of a chute (not shown) suitable for delivering to a base thread forming machine, for example, the shells 15 with the corresponding ends of the shell facing in the same direction at the point of delivery to the said machine.

As best shown in Fig. 2, the embodiment of the invention shown in Figs. 1 and 2 of the drawing also includes a pair of spaced resilient wires 34 and 35 secured by bolts 36 and 37, respectively, to and extending through the hopper wall 11 and over the top ends of the rods 16. The inner ends of the wires 34 and 35 thus brush off any shells 15 which may be balanced upon the top of shells properly supported by the rods. A shell hold-down wire 38 is attached to a bracket 39 secured to one of the parts 10 of the stationary hopper 1 and extends along the receiving end portion 29 of the channel 28 to keep the shells 15 from jumping out of the channel 28 in the operation of the feeder.

While the stationary hopper 1 may be supplied with shells 15 in any convenient manner or by any suitable means, we prefer the apparatus shown partly diagrammatically in Fig. 1 of the drawing, which apparatus provides, automatically, a proper supply of shells to the hopper 1.

As shown in Fig. 1, the supply apparatus comprises an independently supported main supply hopper 40 having a bottom opening across which extends the tray 41 mounted on the diagonal leaf springs 42 of a conventional vibratory type feeder assembly 43. The vibratory feeder assembly includes a solenoid 44 for imparting an oscillatory vibrating motion to the tray 41 through the base member 45 of the assembly. The base member 45 is independently supported and the motion of the tray 41 is effective for releasing shells 15 from the bottom of the supply hopper 40 and carrying the released shells to the stationary hopper 1.

The coil 46 of the solenoid 44 is connected to a timer 47 which, in turn, is connected across the terminals of a suitable current source 48. The timer 47 is set to automatically connect the coil 46 across the terminals 48 of the current source at predetermined time intervals to replenish the supply of shells in the stationary hopper 1.

In order to prevent an over supply of shells to the hopper 1 from the hopper 40 means are provided to interrupt the operation of the timer 47 to stop the flow of shells from the hopper 40 into the hopper 1 when the mass of shells in the latter reaches a predetermined level below the delivery level of the top ends of the rods 16. It is advantageous to keep the level of the mass of shells in the hopper 1 to about the level of the top of the trough or slightly below that level, not only to assure the proper operation of the feeder mechanism, but also to avoid bending, crushing or the like of the thin walls of the shells which may occur when the depth of the mass of shells in the hopper 1 is substantially greater than the depth of the trough.

Accordingly, the means to prevent an over supply of shells to the hopper 1 includes an electrically conductive, base shell feeler or probe member 49 which is electrically insulated from and supported at the proper level with respect to the trough by the arm 50 fastened to a part 10 of the hopper 1.

The feeler member 49 is electrically connected to one terminal of a relay 51, another terminal of which is grounded on the hopper 1 as shown in Fig. 1. The relay 51 is connected to the timer 47 in such manner that the relay interrupts the operation of the timer when the level of the mass of shells is at the aforesaid predetermined level. This is accomplished by the grounding of the relay through the feeler 49, the shells 15, the hopper 1 and the insulated conductor connecting a terminal of the relay to the member 4 of the hopper 1. The shell supply apparatus is thus made inactive until the level of the mass of shells in the hopper 1 is below the predetermined level and the ground connection through the shells is broken. When this occurs, the shell supply apparatus resumes its automatic operation.

The embodiment of the invention shown in a fragmentary sectional view in Fig. 3 of the drawing comprises two base shell receiving troughs and is useful for feeding machines requiring faster feeding of the base shells.

The feeder shown in Fig. 3 is similar to that shown in Figs. 1 and 2 except for the part shown in Fig. 3 in which the circular stationary hopper 1 has two troughs defined, in part, by an annular member 53 having an inverted Y-shape in cross section and bolted to the supports 10 of the outer wall 11 of the hopper 1 with the downwardly sloping walls 54 and 55 of the member 53 defining with the flange 12 and the rim portion 8 of the wall 11 and the part 5, respectively, of the hopper 1 two troughs and two channelways at the bottom of the troughs.

The annular stationary cam 56 for controlling the movements of the rods 16 in a vertical direction is, in this embodiment, substantially larger in internal diameter than the outer diameter of the support post 2 and is attached to the post 2 by the stationary support member 57 bolted to the post. The cam 56 is bolted to an upstanding annular rib flange 58 of the support 57 and is supported thereby in such position relative to the channelways and the bottom of the two troughs of the hopper 1 that the two series of rods 16 supported in a vertical position with their top ends in the channelways extend along the outer surface and the inner surface of the annular cam 56 as shown in Fig. 3.

Each of the inner and outer surfaces of the cam has therein a groove 26 similar in shape to the groove shown in Figs. 1 and 2 and constituting a cam face. Each of the rods in the two series of rods is provided with a roller 59 which engages and follows the grooves 26 as the rods are moved around the post 2 by the means described below.

The annular cam 56 is made up of parts 60, 61, 62 and 63, the part 60 forming the bottom wall of the cam and being bolted to the top of annular rib 58 of support 57, the part 61 forming the inner wall and providing the inner face of the cam being bolted to the bottom part 60, the part 62 forming the top wall of the cam and being bolted to the part 61 and the part 63 forming the outer wall of the cam and being clamped between the top wall 62 and the bottom wall 60.

The actuating means for moving the two series of rods 16 along the respective channelways of the hopper 1 in this embodiment of the invention is in the form of a hollow annular member 64 partially enclosing the annular cam 56 and journaled as shown at 65 on the post 2. The member 64 is made up of ring-shaped parts 66 to 70 bolted together as shown with the part 66 constituting the inner wall which supports the top wall 67 bolted thereto, the outer wall 68 bolted to the top wall 67 and the bottom wall 69 which is bolted directly to the inner wall 66. Part 70 of the annulus is flanged outwardly at its lower end and the flange is clamped between the bottom wall 69 and inner wall 66 as shown.

The inner series of rods 16 extend through guide holes arranged as described in connection with Fig. 1 in the top wall 67 and the bottom wall 69 and the outer series of rods 16 extend through similarly arranged holes in the top wall 67 and in an inwardly extending flange 71 on the lower end of the outer wall 68.

The surface of the outer wall 68 and the surface of the part 70 of the member 64 facing the outer cam face and the inner cam face, respectively, are provided with vertically extending grooves 72, one for each of the rods 16. The sides of the grooves 72 are engaged by rollers 73 on the rods 16. The rods 16 are thus free to move in a vertical direction with respect to the member 64 and are prevented from rotating on their longitudinal axis by the rollers 73 engaging the sides of the grooves 72 which act as vertical guideway for the rollers 73. Also the rods 16 are held with their rollers 59 engaging the sides of the grooves 26 in the inner and outer faces of the cam 56 as the rods are moved by the member 64 along the circular channelways in the hopper 1.

The annular rotary member 64 can be driven through suitable gearing connected with a main drive (not shown) and engaging gear teeth, one of which is shown at 75 on the periphery of the outer wall 68 of the member 64. Part of the wall of support 57 can be broken away to give access to the gear teeth on member 64.

The support 57 forms part of a housing enclosing the rotary member 64. The other parts of the housing are shown at 76 and 77 in the drawing.

The base shells 15 may be fed to both troughs of the stationary hopper 1 of Fig. 3 by a single apparatus of the type shown in Fig. 1 and including a hopper 40, a tray 41 and the supporting and actuating means for the tray shown in Fig. 1, or a separate apparatus of this type may be provided for each of the troughs. The latter arrangement is preferred because it provides control of the level of the mass of shells in each of the troughs. In Fig. 3 a base shell feeler or probe member 49 is shown above each of the troughs and each of the members 49 may be connected to separate relays and timer mechanisms as described in connection with Fig. 1.

As an illustrative example of the invention, the dimensions found to be of critical importance in the embodiments of the feeder shown in Figs. 1 and 3 for the successful feeding of particular sizes of base shells are set forth below.

When the thin-walled cylindrical shells 15 are 0.512 inch in length and 0.444 inch in outer diameter with a circular opening at the inwardly flanged end of the shell of a diameter about one half or less than that of the outer shell diameter, the upper ends of the pick-up rods 16 are $11/32$ inch in diameter, are spaced apart $11/16$ inch between centers in the channelway which is $9/16$ inch wide. The rods are supported with their tips $1/8$ inch below the horizontal plane including the top edges of the channelway while traveling therealong at the bottom of their vertical stroke to pick up shells from the trough. A stroke of about 3 inches is preferred for the rods 16. The sides of the troughs, which are straight in cross section, are at an angle of 90 degrees to each other.

When the shells 15 are 0.425 inch in length and 0.358 inch in outer diameter and have a restricted opening at the flanged end thereof, the upper ends of the pickup rods 16 are ¼ inch in diameter, are spaced apart ½ inch between centers in the channelway which is 33/64 inch wide. The rods are supported with their tips 1/16 inch above the horizontal plane including the top edges of the channelway while traveling at the bottom of their vertical stroke in their shell pick-up position along the channelway. The length of the vertical stroke of the rods and the angular distance between the sides of the trough is the same as given in the foregoing example.

With a shell having a length of 0.679 inch and an outer diameter of 0.599 inch and provided with a restricted opening at one end thereof, the upper ends of the pick-up rods are 7/16 inch in diameter, are spaced apart 13/16 inch between centers in the channelway which is ¾ inch wide and are supported with their tips 3/16 inch above the horizontal plane including the top edges of the channelway while in their shell pick-up positions at the bottom of their vertical stroke. With shells of this size, a vertical stroke of 4 inches is preferred for the rods 16 and the same angle of 90 degrees between the sides of the trough is satisfactory.

It will be understood, of course, that when the feeders are used for shells of different dimensions than those of the shells described above, the dimensions of the feeder parts mentioned are changed accordingly. It will be understood, further, that feeders of the type described above may be used for feeding shells having one open end and one end completely closed.

In Fig. 4 of the drawing, the upper ends of shell pick-up rods 78 particularly useful for feeding thin-walled cylindrical shells having openings of the same size at both ends, are show. The rods of Fig. 4 may be used also for shells having one end at least partially closed. The rods 78 are intended for use with feeders of the type shown in Fig. 3 which feeder includes vertical guide grooves 72 for holding the rods against rotation on their longitudinal axes so that one side only of the rods faces the center of the path of rotation thereof about the stationary support post 2. In Fig. 4, the rods are shown in their shell delivery positions with respect to the shell take-off channel 28.

As shown in Fig. 4, the rods 78 are each provided with a shoulder 79 spaced from the upper tip 80 thereof a distance large enough to permit the open-ended cylindrical shell 81 to slip over the cylindrical upper end 82 of the rod, which is smaller in diameter than the inner diameter of the cylindrical open-ended shell 81. The shoulder 79 has parallel straight sides and rounded ends and is greater in width across the rounded ends and smaller in width across the straight sides thereof than the outer diameter of the shell 81 to be picked up by the rod 78. The shell 81 thus rests on the shoulder 79 with diametrically opposed portions thereof overhanging the straight sides of the shoulder 79. The straight sides of the shoulder 79 extend downward along the rod 78 a distance sufficient to allow the upper end of the rod to pass between the forks of the bifurcated bottom plate 32 of the take-off end 29 of the channel 28. The width of the slot between the forks of the bifurcated plate 32 is greater than the diameter of the top end 82 and the distance between the straight sides of shoulder 79 of the rod 78 and is smaller than the outer diameter of the shells 81. Thus, the shells 81 remain in the take-off end 29 of the channel 28 when the rods 78 are lowered in their travel along the bifurcated end of the plate 32 and are pushed along the channel 28 by succeeding shells as described above in connection with Fig. 2.

While several embodiments of the invention have been shown in the drawing and described above, it will be understood, of course, that numerous changes in the form and details of the feeder mechanisms shown and described may be made by those skilled in the art without departure from the spirit and scope of the invention as defined in the appended claims; for example, the number of troughs in any one feeder may be multiplied as desired with the corresponding number of series of rods and other elements described above and any suitable drive means may be utilized for the feeders.

What we claim as new and desire to secure by Letters Patent of the United States is:

1. A feeder for shells comprising in combination, a hopper having a horizontal trough V-shaped in cross section for accommodating a mass of shells and provided with a bottom channel opening wider than the smallest outer dimension of the shells in the accommodated mass, a series of rods having shell pick-up ends dimensioned to enter said shells, a rod guiding means supporting the rods in said series vertically in alignment with said channel opening and in spaced apart side-by-side relation with the space between successive rods smaller than the smallest outer dimension of the shells, means for reciprocating said rods vertically and in sequence in said guide means, said reciprocating means supporting said rods below said trough at the bottom of their stroke with the tips of their shell pick-up ends at said channel opening to block said opening against said shells, said reciprocating means supporting said rods at the top of their stroke with the upper portions of said rods extending into said trough and the shell pick-up ends thereof at a shell delivery level located a sufficient distance above the bottom channel opening to clear the top of a mass of shells accommodated in said hopper trough, and means to cause relative movement in a horizontal direction between said trough on the one hand and said rods said rod guiding means on the other hand, said rod reciprocating means moving said rods gradually between the bottom and the top of their stroke with a dwell between each movement while said rods and said trough are being moved relative to each other in a horizontal direction whereby the rods except at the bottom of their stroke plow through and agitate the mass of shells accommodated in said trough and shells from said mass slip over the pickup ends of said rods at said channel opening with said rods at the bottom of their stroke.

2. A feeder for shells comprising in combination, a hopper having a horizontal trough V-shaped in cross section for accommodating a mass of shells and provided with a bottom channel opening wider than the smallest outer dimension of the shells in the accommodated mass, a series of rods having shell pick-up ends dimensioned to enter said shells, a rod guiding means supporting the rods in said series vertically in alignment with said channel opening and in spaced apart side-by-side relation with the space between successive rods smaller than the smallest outer dimension of the shells, means for reciprocating said rods vertically and in sequence in said guide means, said reciprocating means supporting said rods below said trough at the bottom of their stroke with the tips of their shell pick-up ends at said channel opening to block said opening against said shells, said reciprocating means supporting said rods at the top of their stroke with the upper portions of said rods extending into said trough and the shell pick-up ends thereof at a shell delivery level located a sufficient distance above the bottom channel opening to clear the top of a mass of shells accommodated in said hopper trough, and means to cause relative movement in a horizontal direction between said trough on the one hand and said rods and said rod guiding means on the other hand, said rod reciprocating means moving said rods gradually between the bottom and the top of their stroke with a dwell between each movement while said rods and said trough are being moved relative to each other in a horizontal direction whereby the rods except at the bottom of their stroke plow through and agitate the mass of shells accommodated in said trough and shells from said mass slip over the pick-up ends of said rods at said channel opening with said rods at the bottom of their stroke and shell take-off means mounted at the delivery level of the pick-up ends of said rods.

3. A feeder for shells comprising in combination, a hopper having a horizontal trough V-shaped in cross section for accommodating a mass of shells and provided with a bottom channel opening wider than the smallest outer dimension of the shells in the accommodated mass, a series of rods having shell pick-up ends dimensioned to enter said shells, a rod guiding means supporting the rods in said series vertically in alignment with said channel opening and in spaced apart side-by-side relation with the space between successive rods smaller than the smallest outer dimension of the shells, means for reciprocating said rods vertically and in sequence in said guide means, said reciprocating means supporting said rods below said trough at the bottom of their stroke with the tips of their shell pick-up ends at said channel opening to block said opening against said shells, said reciprocating means supporting said rods at the top of their stroke with the upper portions of said rods extending into said trough and the shell pick-up ends thereof at a shell delivery level located a sufficient distance above the bottom channel opening to clear the top of a mass of shells accommodated in said hopper trough, and means to cause relative movement in a horizontal direction between said trough on the one hand and said rods and said rod guiding means on the other hand, said rod reciprocating means moving said rods gradually between the bottom and the top of their stroke with a dwell between each movement while said rods and said trough are being moved relative to each other in a horizontal direction whereby the rods except at the bottom of their stroke plow through and agitate the mass of shells accommodated in said trough and shells from said mass slip over the pick-up ends of said rods at said channel opening with said rods at the bottom of their stroke and shell supply means for said hopper controlled by the level of shells in said trough.

4. A feeder for shells having one end opening larger than the other comprising in combination, a hopper having a horizontal trough V-shaped in cross section for accommodating a mass of shells and provided with a bottom channel opening wider than the smallest outer dimension of the shells in the accommodated mass, a series of rods having shell pick-up ends dimensioned to enter said shells through the larger end opening only thereof, a rod guiding means supporting the rods in said series vertically in alignment with said channel opening and in spaced apart side-by-side position with the space between successive rods smaller than the smallest outer dimension of said accommodated shells, means for reciprocating said rods vertically and in sequence in said guide means and supporting said rods below said trough at the bottom of their stroke with the tips of their shell pick-up ends at said channel opening and supporting said rods at the top of their stroke with the upper portions of said rods extending into said trough and their shell pick-up ends at a shell delivery level located a sufficient distance above the bottom channel opening to clear the top of a mass of shells in said trough and means to effect relative movement in a horizontal direction between said trough on the one hand and said rods and said rod guiding means on the other hand, said rod reciprocating means moving said rods gradually between the bottom and the top of their stroke with a dwell between each movement while said rods and said trough are being moved relative to each other in a horizontal direction whereby the rods except at the bottom of their stroke plow through and agitate the mass of shells accommodated by said trough and shells from said mass slip over the shell pick-up ends of said rods at said channel opening with said rods at the bottom of their stroke.

5. A feeder for shells having one end opening larger than the other comprising in combination, a hopper having a horizontal trough V-shaped in cross section for accommodating a mass of shells and provided with a bottom channel opening wider than the smallest outer dimension of the shells in the accommodated mass, a series of rods having shell pick-up ends dimensioned to enter said shells through the larger end opening only thereof, a rod guiding means supporting the rods in said series vertically in alignment with said channel opening and in spaced apart side-by-side position with the space between successive rods smaller than the smallest outer dimension of said accommodated shells, means for reciprocating said rods vertically in said guide means and supporting said rods below said trough at the bottom of their stroke with the tips of their shell pick-up ends at said channel opening and supporting said rods at the top of their stroke with the upper portions of said rods extending into said trough and their shell pick-up ends at a shell delivery level located a sufficient distance above the bottom channel opening to clear the top of a mass of shells in said trough and means to effect relative movement in a horizontal direction between said trough on the one hand and said rods and said rod guiding means on the other hand, said rod reciprocating means moving said rods gradually between the bottom and the top of their stroke with a dwell between each movement while said rods and said trough are being moved relative to each other in a horizontal direction whereby the rods except at the bottom of their stroke plow through and agitate the mass of shells accommodated by said trough and shells from said mass slip over the shell pick-up ends of said rods at said channel opening with said rods at the bottom of their stroke, said feeder comprising also a shell take-off means positioned at the shell delivery level of the shell pick-up ends of said rods, said shell take-off means comprising a bifurcated plate having its forks separated a distance less than the outer diameter of the end of larger opening of said shells and larger than the diameter of the pick-up ends of said rods to receive said rod ends therebetween whereby shells carried by said rod ends remain on said plate when said rods are lowered.

6. A feeder for shells comprising in combination, a hopper having a horizontal trough V-shaped in cross section for accommodating a mass of shells and provided with a bottom channel opening wider than the smallest outer dimension of the shells in the accommodated mass, a series of rods having shell pick-up ends dimensioned to enter said shells, each of said rods having a shell supporting shoulder on the shell pick-up end thereof, said shoulder having one dimension larger than the largest transverse dimension of said shells and one dimension smaller than the smallest transverse dimension of said shells whereby a supported shell extends outwardly beyond the smallest dimensioned part of said shoulder for engagement with a shell take-off means, a rod guiding means supporting the rods in said series vertically in alignment with said channel opening and in spaced apart side-by-side position with the space between successive rods smaller than the smallest outer dimension of said accommodated shells, means for reciprocating said rods vertically in said guide means and supporting said rods below said trough at the bottom of their stroke with the tips of their shell pick-up ends at said channel opening and supporting rods at the top of their stroke with the upper portions of said rods extending into said trough and their shell pick-up ends at a shell delivery level located at a sufficient distance above the bottom channel opening to clear the top of a mass of shells accommodated in said trough and means to effect relative movement in a horizontal direction between said trough on the one hand and said rods and said rod guiding means on the other hand, said rod reciprocating means moving said rods gradually between the bottom and the top of their stroke with a dwell between each movement while said rods and said trough are being moved relative to each other whereby the rods except at the bottom of their stroke plow through and agitate the accommodated mass of shells in said trough and shells from said mass slip over the shell pick-up ends of said rods at said channel opening with said rods at the bottom of their stroke, said feeder comprising also a shell take-off means located at the shell delivery level of the pick-up ends of said rods and comprising a bifurcated plate having forks spaced to receive therebetween the smallest dimensioned part of said shoulder, said forks being spaced apart a distance less than the smallest dimension of said shell whereby said shells remain on said plate when said rods are lowered from said shell delivery level.

7. A feeder for shells having one end opening larger than the other comprising in combination, a stationary circular-shaped open-top hopper, means for supporting said hopper in a horizontal position, said hopper having an annular trough V-shaped in cross section and provided with a bottom channel opening wider than the smallest outer dimension of the shells to be fed, a series of rods having shell pick-up ends dimensioned to enter said shells through the larger end opening only, a drum-shaped member mounted for rotation about its longitudinal axis beneath said hopper and having rod guiding openings supporting the rods in said series vertically in alignment with said channel opening and in spaced apart side-by-side positions with the space between successive rods smaller than the smallest outer dimension of said accommodated shells, stationary means of circular shape within said drum-shaped member including a cam face engaging said rods and on rotation of said guide means reciprocating said rods in sequence in a vertical direction between a position whereat the rods extend downward from said channel opening with the tips of the shell pick-up ends of said rods at said channel opening to block said opening to the passage of shells therethrough and a position whereat the shell pick-up end of said rods are at a shell delivery level above the mass of shells in said trough, and means to rotate said rod guide means to actuate said rods and agitate the mass of shells accommodated by said trough whereby shells from said mass slip over the shell pick-up ends of said rods at said channel opening.

8. A feeder for shells having one end opening larger than the other comprising in combination, a stationary circular-shaped open-top hopper, means for supporting said hopper in a horizontal position, said hopper having an annular trough V-shaped in cross section and provided with a bottom channel opening wider than the smallest outer dimension of the shells to be fed, a series of rods having shell pick-up ends dimensioned to enter said shells through the larger end opening only, a drum-shaped member mounted for rotation about its longitudinal axis beneath said hopper and having rod guiding openings supporting the rods in said series vertically in alignment with said channel opening and in spaced apart side-by-side positions with the space between successive rods smaller than the smallest outer dimension of said accommodated shells, stationary means of circular shape within said drum-shaped member including a cam face engaging said rods and on rotation of said guide means reciprocating said rods in sequence in a vertical direction between a position whereat the rods extend downward from said channel opening with the tips of the shell pick-up ends of said rods at said channel opening to block said opening to the passage of shells therethrough and a position whereat the shell pick-up ends of said rods are at a shell delivery level above the mass of shells in said trough, and means to rotate said rod guide means to actuate said rods and agitate the mass of shells accommodated by said trough whereby shells from said mass slip over the shell pick-up ends of said rods at said channel opening, said feeder comprising also a shell take-off means having a stationary bifurcated plate mounted above said trough and in the circular path of movement of the shell pick-up ends of said rods at the delivery level thereof to receive between its forks the said rod ends, said forks being spaced apart a distance greater than the diameter of the said pick-up ends of the rods and less than the diameter of the end of larger opening of said shells whereby said shells carried by said rods remain on said plate with their ends of larger opening facing downward when said rods are lowered.

9. A feeder for cylindrical shells comprising in combination a stationary circular-shaped open-top hopper, means for supporting said hopper in a horizontal position, said hopper having an annular trough V-shaped in cross section and provided with a bottom channel opening wider than the smallest outer dimension of the shells to be fed, a series of rods having shell pick-up ends dimensioned to enter said shells, each of said rods having a shell supporting shoulder on the shell pick-up end thereof, said shoulder having one dimension larger and one dimension smaller than the outer diameter of said shells whereby a supported shell extends outwardly beyond the smallest dimensioned part of said shoulder, a circular-shaped rod guiding member mounted for rotation about its longitudinal axis beneath said hopper and having rod guiding means supporting the rods in said series vertically in alignment with said channel opening and in spaced apart side-by-side positions with the space between successive rods smaller than the smallest outer dimension of said accommodated shells and having also vertical grooves in a face thereof engaged by said rods to hold said rods anti-turningly on their longitudinal axes with largest dimensioned part of said shell supporting shoulders in the direction of rotation of said rods, a stationary means of circular shape including a cam face engaging said rods and on rotation of said guide means reciprocating said rods in sequence in a vertical direction between a position whereat the rods extend downward from said channel opening with the tips of the shell pick-up ends of said rods at said channel opening to block said opening to the passage of shells therethrough and a position whereat the shell pick-up ends of said rods are at a shell delivery level above the mass of shells in said trough, means to rotate said rod guiding means to actuate said rods and agitate the mass of shells accommodated by said trough whereby shells from said mass slip over the shell pick-up ends of said rods at said channel opening, said feeder comprising also a shell take-off means having a stationary bifurcated plate mounted above said trough and in the circular path of movement of the shell pick-up ends of said rods at the delivery level thereof to receive between its forks the said rod ends, said forks being spaced apart a distance greater than the part of smallest dimension of said shoulders and less than the diameter of said shells whereby shells carried by said rods carried by the shouldered shell pick-up ends of said rods remain on said plate when said rods are lowered.

References Cited in the file of this patent

UNITED STATES PATENTS

| | | |
|---|---|---|
| 557,136 | Mengel et al. | Mar. 31, 1896 |
| 1,693,650 | Latham | Dec. 4, 1928 |
| 2,543,244 | Klooz et al. | Feb. 27, 1951 |

FOREIGN PATENTS

| | | |
|---|---|---|
| 1,076,857 | France | Apr. 21, 1954 |